(12) United States Patent
Shiwei et al.

(10) Patent No.: US 8,084,952 B1
(45) Date of Patent: Dec. 27, 2011

(54) METHOD AND SYSTEM TO DETECT ZERO CURRENT CONDITIONS IN AN ELECTRONIC BALLAST BY MONITORING VOLTAGE ACROSS A BUCK INDUCTOR

(75) Inventors: Yu Shiwei, Shanghai (CN); Gao Qin, Shanghai (CN); Guo Sui, Shanghai (CN)

(73) Assignee: Universal Lighting Technologies, Inc, Madison, AL (US)

( * ) Notice: Subject to any disclaimer, the term of this patent is extended or adjusted under 35 U.S.C. 154(b) by 646 days.

(21) Appl. No.: 12/235,363

(22) Filed: Sep. 22, 2008

(51) Int. Cl.
  *H05B 37/02* (2006.01)
(52) U.S. Cl. .................... 315/209 R; 315/283; 315/291; 315/307; 363/34; 363/75
(58) Field of Classification Search .............. 315/200 R, 315/209 R, 224, 225, 226, 227 R, 244, 246, 315/247, 283, 291, 307; 363/34, 74, 75
See application file for complete search history.

(56) References Cited

U.S. PATENT DOCUMENTS

| | | | |
|---|---|---|---|
| 4,723,098 A * | 2/1988 | Grubbs .................... 315/306 |
| 5,814,976 A * | 9/1998 | Allison .................... 323/224 |
| 5,969,484 A * | 10/1999 | Santi et al. .................... 315/247 |
| 6,388,397 B1 | 5/2002 | Iwahori | |
| 6,577,078 B2 * | 6/2003 | Shen .............................. 315/307 |
| 6,670,779 B2 | 12/2003 | Shen | |
| 6,864,645 B2 | 3/2005 | Sun et al. | |
| 7,221,107 B2 | 5/2007 | Melis | |
| 7,245,088 B2 * | 7/2007 | Huang et al. ................... 315/291 |
| 7,432,664 B2 * | 10/2008 | Moskowitz .................... 315/224 |
| 7,439,689 B2 * | 10/2008 | Honda et al. .................. 315/307 |
| 2004/0183463 A1 | 9/2004 | Sun et al. | |
| 2005/0067981 A1 | 3/2005 | Bocchiola | |
| 2006/0232220 A1 | 10/2006 | Melis | |
| 2007/0273304 A1 | 11/2007 | Greenwood et al. | |

* cited by examiner

*Primary Examiner* — Thuy Vinh Tran
(74) *Attorney, Agent, or Firm* — Waddey & Patterson, P.C.; Mark J. Patterson

(57) ABSTRACT

The invention discloses a method and system to detect zero current conditions in a buck inductor by monitoring the voltage across the buck inductor. Once zero current and voltage conditions are present, an inverter circuit changes the operational state, i.e. conducting or non-conducting, of the switching transistors driving the lamps to reduce power loss associated with changing the operational state of switching transistors when under a load.

20 Claims, 3 Drawing Sheets

METHOD AND SYSTEM TO DETECT ZERO CURRENT CONDITIONS IN AN ELECTRONIC BALLAST BY MONITORING VOLTAGE ACROSS A BUCK INDUCTOR

BACKGROUND OF THE INVENTION

The present invention relates generally to electronic ballasts for gas discharge lamps. More specifically, this invention pertains to electronic ballasts having circuitry to provide for zero-current switching of the ballast switching transistors.

The operation of a gas discharge lamp requires, among others, a mechanism to control the current delivered to the lamp. Initially, this role was satisfied by magnetic ballasts. However, with the proliferation of integrated circuits, the focus has turned to electronic ballasts to manage the operation of the lamp. The migration from magnetic ballasts to electronic ballasts is due, in significant part, to the increased operational efficiency afforded by electronic ballasts, relative to magnetic ballasts.

The increased efficiency of electronic ballasts is attributable to several factors, one key factor being the use of switching transistors to alter the frequency of the power signals received from the power source, e.g. a standard 120 Volt, 60 Hertz wall outlet, before the power signals are delivered to the lamp. However, using transistors to facilitate power delivery to the lamp can also present efficiency challenges. Namely, for optimal operating efficiency, transistors should be turned on and off, i.e. switched, under little, or more preferably, no load. Thus, if a power signal, comprised of both a current signal and a voltage signal, is present while the transistor is switching, a power loss will occur. This leads to energy inefficiencies and is therefore undesirable. Consequently, switching the transistors when the voltage and current signals are both zero ensures maximum switching efficiency.

Because of the transient and unpredictable nature of the power signal, minimizing switching losses is not an easy task. Numerous strategies have been employed to reduce these losses. Integral to any strategy attempting to address this problem is detecting current and/or voltage signals as at least one must be known for any scheme desiring to reduce switching losses. For example, some strategies are based on monitoring and acting off of the voltage signal alone. Unfortunately, such a strategy has many deficiencies. One such deficiency is that just because the voltage signal may be zero, or at a minimum, does not necessarily mandate that the current signal is also at a minimum. If both current and voltage signals are not at their respective minimum values then the switching efficiency is not maximized. Thus, strategies that rely solely on the state of the voltage level present at the transistor to reduce switching losses are not ideal.

Another strategy is targeted at sensing zero current conditions in the ballast, and more precisely at the switching transistors. Common schemes employing this technique often require floating circuits (circuits without a connection to a common ground or reference voltage). Floating circuits are complex and, accordingly, costly and more prone to failure than non-floating circuits.

Thus, what is needed is a circuit that can detect both zero voltage and current switching conditions in an electronic ballast so that switching losses can be reduced and/or eliminated. Further, it is also desirable that such a circuit would be reliable and inexpensive.

BRIEF SUMMARY OF THE INVENTION

To effectively reduce switching losses in electronic ballasts, the status of the transistors providing power signals to the lamp(s) must first be known. However, directly monitoring the power signals at the switching transistors is not a trivial endeavor. In some cases, such monitoring may impair the performance of the transistors and, more generally, the electronic ballast. However, monitoring the power signals associated with the buck inductor, a component in the power converter circuit driving the lamp(s), provides an accurate representation of the power signals associated with/loading the switching transistors, thereby indicating the switching transistors' status, without the deleterious effects mentioned above.

The present invention is a system and method for determining the power conditions in an electronic ballast. More particularly, the present invention monitors the voltage across a buck inductor to determine when the current through the buck inductor is at or near zero. If the current and voltage associated with the buck inductor are known, then the current and voltage conditions associated with the switching transistors can reliably be extrapolated. Knowing when zero voltage and current conditions are present permits the switching transistors to change operation (i.e. from non-conducting to conducting and vice versa) under low or no load conditions and, thereby, allows the electronic ballast to function more efficiently and reliably.

STRUCTURE OF THE INVENTION

The present invention provides a rectifying circuit coupled to the power supply circuit to generate a rectified version of the voltage across the buck inductor ("rectified buck inductor signal"). The rectifying circuit may sense the voltage across the buck inductor via a winding magnetically coupled to the buck inductor. Accordingly, changes in the current or voltage associated with the buck inductor will be reflected in the rectified buck inductor signal. For example, when there is no current or voltage associated with the buck inductor, the magnitude of the rectified buck inductor signal will be zero.

The present invention also includes a compensator circuit coupled to the power supply circuit to generate a compensation signal. The compensation signal is responsive to the rectified buck inductor signal. Thus, under certain buck inductor power conditions, as indicated by the signal characteristics of the rectified buck inductor signal, the compensation signal may be generated.

A comparing circuit is coupled to the rectifying circuit to receive the rectified buck inductor signal (when present), to the compensator circuit to receive the compensation signal (when present), and to a reference signal generator to receive a reference signal. The comparing circuit compares the reference signal to the rectified buck inductor signal, to the compensation signal, or to a combination of the rectified buck inductor signal and the compensation signal. The comparing circuit generates a comparing circuit output signal that is modulated by the result of the above-described comparisons. In one embodiment, the comparing circuit includes a comparator. The comparing circuit output is directed to the power supply circuit to instruct the power supply circuit to alter its output to the lamps to enhance the efficiency and reliability of the electronic ballast. Specifically, the power supply circuit controls the operation of the lamp according to the comparing circuit output, which indicates when the switching transistors are not loaded—thereby increasing the efficiency and reliability of the ballast by permitting the transistors to be switched under no load conditions.

OPERATION OF THE PRESENT INVENTION

The operation of the invention is best explained through an example, consider the following. In one preferred embodiment, during normal operation (i.e. a switching transistor is on and conducting), the rectified buck inductor signal is provided to the comparing circuit. Under these conditions the comparison between the rectified buck inductor signal and the reference signal does not cause the comparing circuit to change its output—it is only desired to change the output of the comparing circuit when both zero current and zero voltage are detected in the buck inductor, a situation not present during normal operation.

As the switching transistor is instructed to stop conducting, the current through the buck inductor will fall toward zero. This results in the rectified buck inductor signal quickly falling to zero. If this were to occur, a comparison between only the rectified buck inductor signal and the reference signal would cause the comparing circuit to change its output and instruct the power supply circuit accordingly. However, although the magnitude of the rectified buck inductor signal is temporarily zero or close to zero, there is still some current associated with the buck inductor and, hence, immediately changing the operational state of the switching transistors (after the indication from the falling rectified buck inductor signal) would result in inefficiencies—the transistors would still be loaded.

To combat this problem, the present invention utilizes the compensator circuit to supply the compensation signal. During and immediately after this transitional phase, as the switching transistor is changing states from conducting to non-conducting, the compensation signal (or the combination of the compensational signal and the rectified buck inductor signal) prevents the comparing circuit from changing its output.

After the switching transistor has stopped conducting, the remaining current associated with the buck inductor will discharge, which will be reflected in the buck inductor signal. Accordingly, during this process, the compensator circuit will continue to provide the compensation signal to the comparing circuit to delay the comparing circuit from changing its output before the current in the buck inductor has fully discharged. Next, with contributions from neither the rectified buck inductor signal nor the compensation circuit, the comparing circuit will change its output and direct the power supply circuit to alter the operation of the lamp.

Because the method of the present invention has determined that both voltage and current are zero, and the transistors are unloaded, switching efficiency can be increased. The method of the present invention also works to prevent false triggering of the comparing circuit because the operation of the comparing circuit is controlled by both the rectified buck inductor signal and the compensation signal. If the compensation signal is not present, the comparing circuit may be triggered to change its output when the level of the rectified buck inductor signal initially falls to zero, which is undesirable because of transient signals that remain in the ballast. Further, the compensation signal must not be present after the transient signals have discharged, as it is now desirable for the comparing circuit to trigger.

DETAILED DESCRIPTION OF THE INVENTION

The present invention relates generally to electronic ballasts for gas discharge lamps. More specifically, this invention relates to an electronic ballast with a zero-current detection circuit.

Figure 1:
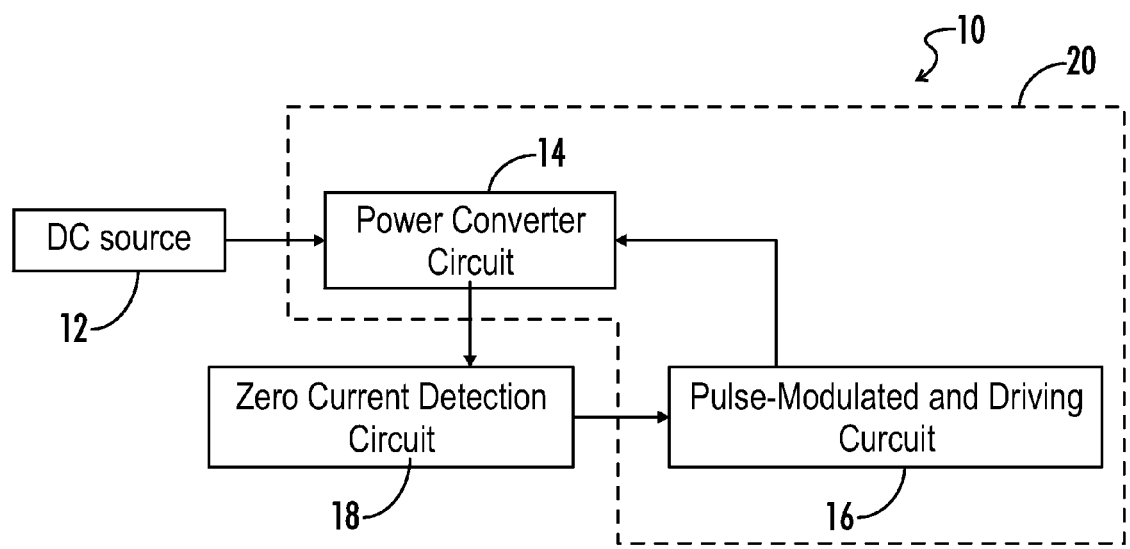
FIG. 1 is a block diagram of the present invention.

FIG. 1 is a block diagram of a portion of an electronic ballast 10. The block diagram illustrates a DC source 12 supplying power to the ballast 10. The DC source 12 may be a generator providing a DC signal. The DC source 12 may also describe the output of a rectifier circuit that accepts AC signals from an AC source and converts them into substantially constant DC signals. Further, the DC source 12 may describe the output of a power factor correcting circuit (or combination power factor correcting and boost circuit) that accepts a DC signal input, usually from a rectifier circuit, and generates a DC signal at a desired level and ensures that the power factor of the AC source does not deviate from a predetermined range.

The DC source 12 is coupled to a power converter circuit 14 (PCC), or inverter circuit 14. The PCC 14 accepts the output from the DC source 12 and converts the DC signal into a high frequency AC signal. This high frequency AC signal passes through a low-pass filter circuit and becomes a low frequency signal (e.g. 100 Hz-200 Hz) to drive the lamp(s). The PCC 14 includes, typically, two or four switching transistors (four transistors corresponding to full bridge circuit) that facilitate the conversion of the DC signals from the DC source 12 into low frequency AC signals suitable to operate the lamp(s).

FIG. 1 also depicts a Pulse Modulated and Driving Circuit 16 (PMDC). The PMDC 16 controls the operation of the switching transistors in the PCC 14. Specifically, the PMDC 16 manages the switching transistors by modulating the duration of the conducting and non-conducting states of the transistors. This modulation functions to control the ultimate operation of the lamp(s).

It is well known by those of ordinary skill in the art that changing the operational state (i.e. changing a transistor from conducting to non-conducting or vice versa) while the transistor is loaded (i.e. a power signal with an appreciable signal strength is present at the transistors) causes the transistor to operate inefficiently. Accordingly, it is desirable to switch transistors under no load conditions to enhance the overall efficiency of the electronic ballast.

To this end, the present invention provides a zero current detection circuit 18. The zero current detection circuit 18 monitors the voltage across/current through a buck inductor located in the PCC 14 (or another element in the PCC 14) which is an excellent approximation of the load seen by the switching transistors. Based on the power conditions associated with the buck inductor, the zero current detection circuit 18 can determine the current level through the buck inductor so that the detection circuit 18 can inform the PMDC 16 when the switching transistors are under no load conditions to permit the PMDC 16 to efficiently change the operational state of the transistors. The PMDC 16 and the PCC 14 may be collectively referred to hereinafter as a power supply circuit 20, driving circuit 20, or an inverter supply circuit 20.

Now that a general overview of the present invention has been completed, a more detailed discussion of the structure and operation of the invention is in order. The power supply circuit 20 is operable to generate a switching control signal, also referred to as a transistor signal or an inverter control signal. The switching control signal describes the signal controlling the operation of the switching transistors 22 and 24. Specifically, it describes when the transistor 22 or 24 is conducting or non-conducting, i.e. the switching transistor state.

Figure 2:
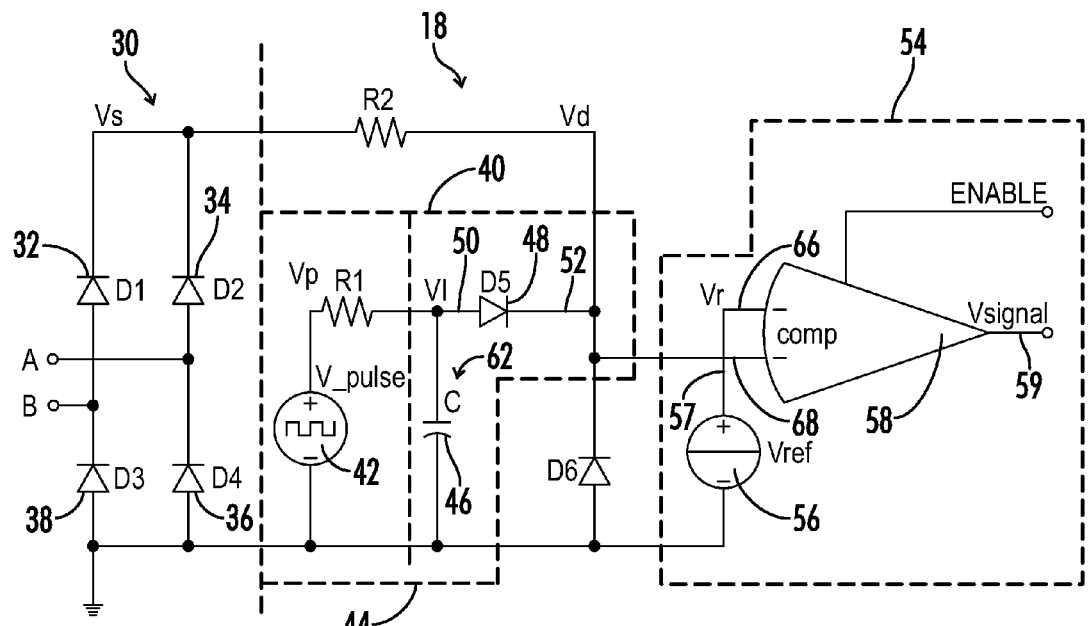
FIG. 2 is a schematic drawing of one embodiment of the present invention.
Figure 3:
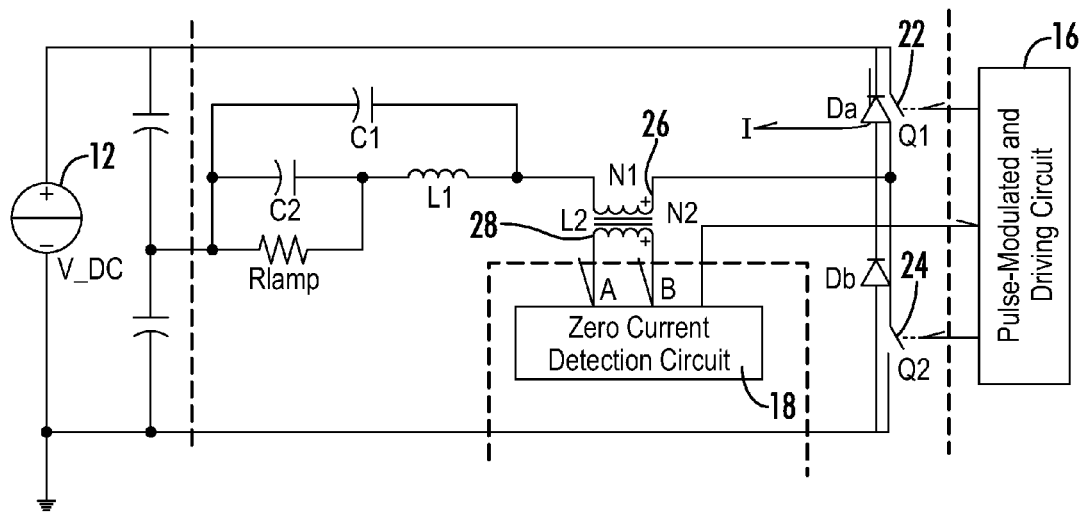
FIG. 3 is a schematic drawing of another embodiment of the present invention.

A rectifying circuit 30 (also referred to as a rectifier 30 or conditioning circuit 30) as shown in FIGS. 2 and 3, is coupled to the power supply circuit 20 via a secondary winding 28 (FIG. 3). More particularly, the secondary winding 28 is magnetically coupled to the buck inductor 26 (a component of the power supply circuit 20). However, the present invention also envisages capacitive and resistive couplings between the rectifying circuit 30 and the power supply circuit 20. In one embodiment, the rectifying circuit 30 includes four diodes 32, 34, 36, and 38. As shown in step 80 of FIG. 4, the rectifying circuit 30 provides a rectified buck inductor signal or a conditioned buck inductor signal, at a rectifier output, which is a rectified version of the buck inductor signal—the rectified buck inductor signal is a DC conversion of the AC signal associated with the buck inductor 26. Importantly, the rectifying circuit 30 accommodates rectification regardless of the phase of the AC buck inductor signal.

Figure 4:
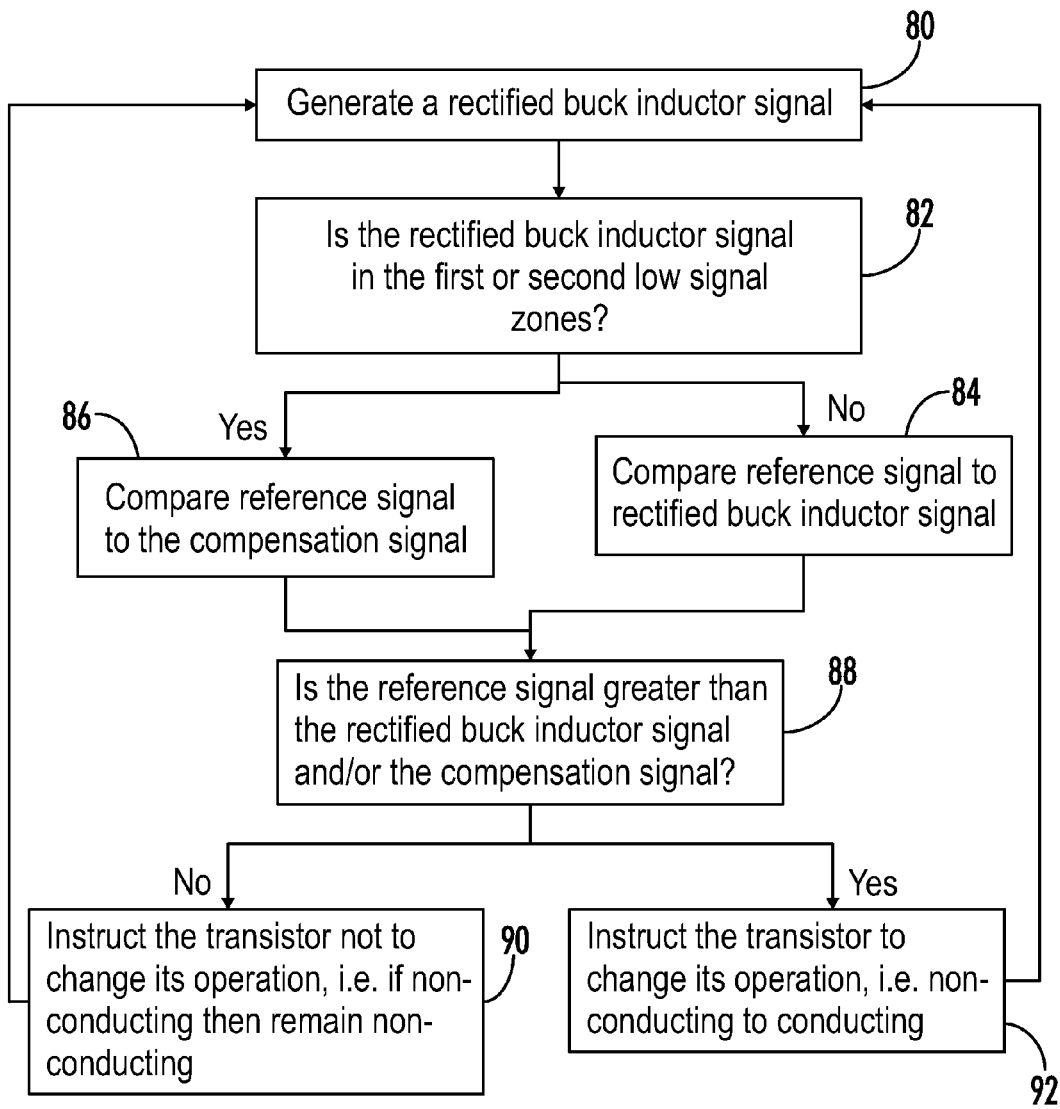
FIG. 4 is a flow chart describing a sequence of steps implemented by one embodiment of the invention to determine zero current conditions in the buck inductor.

The present invention also includes a compensator circuit 40 coupled to the power supply circuit 20. The compensator circuit 40 generates a compensation signal for when the rectified buck inductor signal is in a first low signal zone, which will be explained in more detail below. The determination of whether the compensation signal should be generated is shown in FIG. 4, step 82. Thus, the compensator circuit 40 only provides the compensation signal in response to predetermined conditions of the rectified buck inductor signal.

In some embodiments, the compensator circuit 40 may include a pulse generator 42 (or tracking source 42) with a pulse output Vp (or tracking source output Vp) that provides a pulse generator signal V pulse (also referred to as a tracking source signal) representative of the switching control signal. Preferably, the pulse generator signal has a phase that is synchronized to the phase of the switching control signal. However, in one embodiment, the pulse generator 42 may only provide the pulse generator signal when the switching control signal is in a predefined signal activation range, a range that may be tied to frequency, amplitude and/or phase of the switching control signal. The switching control signal manages the operation of the switching transistors 22 and 24, i.e. conducting or non-conducting. The switching control signal is generated by the PMDC 16 or the power supply circuit 20, more generally. Control of the switching control signal is important because the switching control signal must be properly managed to ensure that the switching transistors 22 and 24 only change operation while they are unloaded—thereby minimizing power loss associated with the switching process.

The compensator circuit 40 may also have a guarding circuit 44. The guarding circuit 44 is coupled to the generator 42, the rectifying circuit 30, and the comparing circuit 54. The guarding circuit 44 is operable to generate a guarding circuit signal or a charge storing signal. The guarding circuit 44 may include a capacitor 46 or charge storing device 46 coupled to the pulse generator 42, or more specifically the pulse output Vp, to receive the pulse generator signal. The connection between the pulse generator 42 and the capacitor 46, or the first end of the capacitor 62, allows the capacitor 46 to be charged by the pulse generator signal. Further, in one embodiment, the pulse generator signal will charge the capacitor 46 only when a switching transistor 22 or 24 is conducting (as the pulse generator signal is synchronized or keyed-off of the switching control signal). In another embodiment, the capacitor 46 may also be charged by the rectified buck inductor signal from the rectifying circuit 30.

The guarding circuit 44 may also include a voltage-controlled switch 48, such as a diode 48, connected between the capacitor 46 and the conditioning circuit 30. More precisely, the anode 50 (or switch input 50 or first switch end 50) of the diode 48 would couple to the capacitor 46, or equivalently the pulse output 60, and the cathode 52 (or switch output 52 or second switch end 52) would couple to the output of conditioning circuit 30 to receive the rectified buck inductor signal. In one embodiment, the cathode 52 couples to both the output of conditioning circuit 30 and the input of a comparing circuit 54.

In a preferred embodiment, the discharge of the capacitor 46 (i.e. the generation of the guarding circuit signal or all or some of the compensation signal) occurs when the pulse generation signal becomes low, as the switching transistors 22 or 24 turn off. First and second low signal zones describe ranges of rectified buck inductor signal levels that indicate low current or low voltage levels in/across the buck inductor 26. Recognizing the low current/voltage zones permits the compensator circuit 40/guarding circuit 44 to generate the compensation signal/guarding signal to prevent or help to prevent the comparing circuit 54 from changing its output while the switching transistor 22 or 24 is loaded, or in other words during the duration of the first low signal zone. The capacitor 46 is selected so as to ensure that a compensation signal is available when needed during the first low signal zone, but also to ensure that the capacitor 46 will fully discharge through R1 to ground before the rectified buck inductor signal discharges during the second low signal zone.

More specifically, the first low signal zone describes the signal characteristics of the rectified buck inductor signal seen upon a change in the operational state of the switching transistor 22 or 24, from conducting to non-conducting. Namely, during this period, the signal level of the rectified buck inductor signal will quickly fall to zero, although some current will still be associated with the buck inductor 26. Because the transistor 22 or 24 is not fully unloaded (i.e. current still associated with the buck inductor 26), inefficiencies will result if the operational state of the transistor 22 or 24 is altered. The first low signal zone describes this initial drop of the rectified buck inductor signal during an operational change in the transistor's switching state.

The second low signal zone describes the signal characteristics of the rectified buck inductor signal seen immediately after the first low signal zone. Particularly, after the change of state has occurred, the remaining current associated with the buck inductor 26 will begin to discharge and cause a temporary increase and subsequent fall (after the buck inductor 26 has discharged) in the signal level of the rectified buck inductor signal. During this time the compensation signal is no longer necessary to prevent the comparing circuit 54 from changing its output, as the discharge from the buck inductor 26 is sufficient to perform the same function. Therefore the capacitor 46 discharges through R1 to ground, and when the remaining current in the buck inductor 26 is discharged to zero, the second low signal zone ends, and the comparing circuit 54 is free to change its output.

FIG. 2 also shows the comparing circuit 54 or evaluation circuit 54. The comparing circuit 54 is coupled to the rectifying circuit 30 to receive the rectified buck inductor signal and to the compensator circuit 40 to receive the compensation signal (or, in one embodiment, guarding circuit signal). In one embodiment, a reference source 56 is also provided to generate a reference source signal Vr which is delivered, via a reference source output 57, to the comparing circuit 54, or more specifically to a comparator 58 in the comparing circuit 54. Further, in this embodiment, the reference source 56 is coupled to the second input of the comparator 66, and both the conditioning circuit 30 and the cathode of the diode 52 are coupled to the first input of the comparator 68.

The comparing circuit 54 compares the reference signal with the rectified buck inductor signal, when present, and the compensation signal, when present. According to the results of the comparison, the comparing circuit 54 provides a modulated comparing circuit output signal (or comparator signal) Vsignal at the comparator output 59 to the input of the power supply circuit 20. The function of the comparing circuit 54 is depicted in FIG. 4, steps 84, 86, and 88. The power supply circuit 20 alters the switching control signal in response to the modulated comparing circuit output signal to change the operational state of the switching transistors 22 and 24 so that the transistors 22 and 24 switch under no load conditions to increase their operational efficiency, as shown in FIG. 4 steps 90 and 92. It is also envisioned by the present invention that the comparing circuit 54 base its output on a comparison between only the relative values of the rectified buck inductor signal and the compensation signal. Further, it will also be appreciated by one of ordinary skill in the art that the comparing circuit 54 could perform its intended function by examining the absolute value of the rectified buck inductor signal and/or the compensation signal in isolation.

Now that all of the individual components of the present invention have been introduced, it will be instructive to detail the operation of the invention in its entirety. A flow diagram describing the operation of the present invention is given in FIG. 4.

Consider one of the switching transistors 22 or 24 is conducting, as directed by the switching control signal. Accordingly, there will be a voltage across/current through the buck inductor 26 that will result in a rectified buck inductor signal, via the rectifying circuit 30. Because the switching control signal is causing a switching transistor 22 or 24 to conduct, and the pulse generator 42 is synchronized with the switching control signal, the pulse generator 42 will provide the pulse generator signal to the capacitor 46 which will charge the capacitor 46. Depending on the signal level of the rectified buck inductor signal, the voltage across the capacitor 46 may or may not be sufficient to cause the diode 48 to conduct. Thus, while a switching transistor 22 or 24 is conducting, the comparing circuit 54 will compare the reference signal from the reference signal generator 56 with the rectified buck inductor signal and, depending on the signal level of the rectified buck inductor signal, possibly the compensation signal. Regardless, the output of the comparing circuit 54 will not cause the power supply circuit 20 to change the state of the switching transistor 22 or 24. Changing the switching state would be undesirable as the transistor 22 or 24 would be loaded and changing the operational state would result in inefficiencies.

Now consider that the switching transistor 22 or 24 is turning off—changing from a conducting state to a nonconducting state. This causes the signal level of the rectified buck inductor signal to quickly fall, although the buck inductor 26 has not discharged all of its current. Moreover, as the switching control signal is no longer informing the transistor 22 or 24 to conduct (and the pulse generator 42 is synchronized with the switching control signal), the pulse generator 42 will cease to provide the generator signal. Without a rectified buck inductor signal of sufficient magnitude (with regard to the magnitude of the reference signal), the output of the comparing circuit 54 would change resulting in an instruction to alter the conducting state of the transistor 22 or 24. However, as mentioned above, there is still some current associated with the buck inductor 26 and, hence, the transistor 22 or 24 is still loaded. Thus, changing the operational state of the transistor 22 or 24 at this time is ill advised.

To combat this (i.e. to stop the comparing circuit output from changing before the current associated with the buck inductor 26 has discharged), the compensation signal/guarding circuit signal is provided and temporarily exceeds the reference signal to cause the comparing circuit output signal to remain constant. Specifically, the capacitor 46, which was charged by the generator signal, discharges to hold the comparing circuit output signal constant as the discharge results in a guarding circuit signal having a magnitude greater than that of the reference signal. The temporary presence of the compensation signal prevents the switching transistor 22 or 24 from changing operational states under load. These events occur during the first low signal zone.

After the switching transistor 22 or 24 stops conducting, the remaining current associated with the buck inductor 26 will begin to discharge. This discharge will be manifested by a renewed surge of the rectified buck inductor signal. Therefore, the rectified buck inductor signal holds the output of the comparing circuit 54 until the buck inductor 26 has fully discharged and without further assistance from the compensation signal.

After this sequence, the compensation signal is absent (the generator signal is not being provided as dictated by the phase of the switching control signal and the capacitor 46 is fully discharged) and there is no rectified buck inductor signal as both the current through and the voltage across the buck inductor 26 are zero. Thus, the comparison between the reference signal and the compensation signal, the rectified buck inductor signal, or some combination thereof results in a change in the output of the comparing circuit 54. The change in the comparing circuit's output indicates that the switching transistor 22 or 24 is free to change its operation under no load conditions and the power supply circuit 20 acts accordingly.

Thus, although there have been described particular embodiments of the present invention of a new and useful METHOD AND SYSTEM TO DETECT ZERO CURRENT CONDITIONS IN AN ELECTRONIC BALLAST BY MONITORING VOLTAGE ACROSS A BUCK INDUCTOR, it is not intended that such references be construed as limitations upon the scope of this invention except as set forth in the following claims.

What is claimed is:

1. An electronic ballast for a gas discharge lamp comprising:
   a power supply circuit comprising a buck inductor;
   a rectifying circuit coupled to the power supply circuit to provide a rectified buck inductor signal responsive to voltage across the buck inductor, wherein the rectified buck inductor signal has associated first and second low signal zones, and further wherein each of the first and second low signal zones corresponds to distinct power conditions of the buck inductor;
   a compensator circuit coupled to the power supply circuit and to the rectifying circuit, and operable to provide a compensation signal when the rectified buck inductor signal is in the first low signal zone;
   a reference source operable to provide a reference signal;
   a comparing circuit coupled to the reference source, to the rectifying circuit, and to the compensator circuit to receive the reference signal, the rectified buck inductor signal, and the compensation signal;
   the comparing circuit operable to provide a comparing circuit output signal that is modulated by comparisons between the reference signal, the rectified buck inductor signal, and the compensation signal; and the power supply circuit further comprising an input coupled to receive the comparing circuit output signal, the power supply circuit being responsive to the comparing circuit output signal to control the operation of the lamp.

2. The ballast of claim 1, wherein the compensator circuit comprises a pulse generating source with a pulse output, wherein the pulse generating source is operable to produce a pulse signal at the pulse output.

3. The ballast of claim 2, wherein the power supply circuit is operable to generate a switching control signal, the power supply circuit further comprising a switching transistor to receive the switching control signal, and wherein the switching control signal has a phase and the pulse signal has a phase synchronized with the phase of the switching control signal.

4. The ballast of claim 2, wherein the compensator circuit comprises a capacitor coupled to the pulse output.

5. The ballast of claim 4, wherein the comparing circuit comprises a comparator coupled to the compensator circuit to receive the compensation signal, to the rectifying circuit to receive the rectified buck inductor signal, and to the reference source to receive the reference signal.

6. The ballast of claim 5, wherein the compensator circuit further comprises a voltage-controlled switch with a switch input coupled to the pulse output and a switch output coupled to the comparator.

7. The ballast of claim 6, wherein the voltage-controlled switch is a diode.

8. An electronic ballast for a gas discharge lamp comprising:
a driving circuit operable to generate a switching control signal having a signal activation range and comprising a buck inductor and a driving circuit input;
a conditioning circuit coupled to the buck inductor to provide a conditioned buck inductor signal representative of voltage across the buck inductor, wherein the conditioned buck inductor signal has associated first and second low signal zones;
a generator coupled to the driving circuit and operable to provide a generator signal when the switching control signal is in the signal activation range, and wherein the generator signal is representative of the switching control signal;
a guarding circuit coupled to the generator to receive the generator signal and to the conditioning circuit to receive the conditioned buck inductor signal wherein the guarding circuit is operable to provide a guarding circuit signal when the conditioned buck inductor signal is in the first low signal zone;
an evaluation circuit coupled to the conditioning circuit to receive the conditioned buck inductor signal and to the guarding circuit to receive the guarding circuit signal;
the evaluation circuit operable to provide an evaluation signal to the driving circuit input, wherein the evaluation circuit modulates the evaluation signal in response to changes in the conditioned buck inductor signal and the guarding circuit signal; and
wherein the driving circuit responds to changes in the evaluation signal by altering the operation of the lamp.

9. The ballast of claim 8, wherein the switching control signal has a phase and the generator signal has a phase matched to the phase of the switching control signal.

10. The ballast of claim 8, wherein the guarding circuit comprises a capacitor having a first capacitor end coupled to the generator.

11. The ballast of claim 10, wherein the guarding circuit further comprises a voltage controlled switch having a first switch end coupled to the first capacitor end and a second switch end coupled to both the conditioning circuit and the evaluation circuit.

12. The ballast of claim 11, wherein the voltage controlled switch is a diode having an anode coupled to the first capacitor end and a cathode coupled to both the conditioning circuit and the evaluation circuit.

13. The ballast of claim 12, wherein the evaluation circuit comprises a reference voltage source and a comparator with a first input coupled to both the conditioning circuit and the cathode of the diode and a second input coupled to the reference voltage source.

14. A method of operating an electronic ballast for a gas discharge lamp, the electronic ballast having a power supply circuit and a buck inductor, the method comprising:
supplying a transistor signal, via the power supply circuit, to a switching transistor to manage the operation of the gas discharge lamp, wherein the transistor signal has a transistor switching state;
generating a conditioned buck inductor signal representative of voltage across the buck inductor, wherein the conditioned buck inductor signal has first and second low signal zones;
if the conditioned buck inductor signal is in one of the first and second low signal zones, providing a compensator circuit signal, via a compensator circuit, to a comparing circuit;
comparing the conditioned buck inductor signal and the compensator circuit signal with a reference signal via the comparing circuit; and
modulating an input of the power supply circuit in response to the comparison of the reference signal with the conditioned buck inductor signal and the compensator circuit signal to control the switching transistor by altering the transistor switching state to manage the operation of the lamp.

15. The method of claim 14, wherein the compensator circuit comprises a pulse generator.

16. The method of claim 15, wherein the transistor signal has a phase and the pulse generator has a phase synchronized with the transistor switching state of the transistor signal.

17. The method of claim 16, wherein the compensator circuit comprises a capacitor.

18. The method of claim 17, wherein the capacitor is coupled to the pulse generator.

19. A circuit for detecting zero current conditions in a buck inductor in an inverter supply circuit, wherein the inverter supply circuit has an inverter input, an inverter output coupled to switching transistors with a switching state, the inverter supply circuit being operable to provide an inverter control signal at the inverter output to control the switching state of the switching transistors, the circuit for detecting zero current conditions comprising:
a rectifier having a rectifier input coupled to the buck inductor and a rectifier output, wherein the rectifier generates a rectified buck inductor signal at the rectifier output representative of voltage across the buck inductor, wherein the rectified buck inductor signal has first and second low signal zones;
a tracking source having a tracking source input coupled to the inverter supply circuit, and a tracking source output, wherein the tracking source generates a tracking source signal at the tracking source output representative of the switching state;

a charge storing device coupled to the tracking source output, the rectifier output, and operable to generate a charge storing signal when the rectified buck inductor signal is in the first low signal zone;

a reference source having a reference source output and generating a reference source signal at the reference source output;

a comparator with a first comparator input coupled to the rectifier output to receive the rectified buck inductor signal and to the charge storing device to receive the charge storing signal a second comparator input coupled to the reference source output to receive the reference source signal, and a comparator output coupled to the inverter input; and wherein the comparator generates a comparator signal at the comparator output and the inverter input responds to changes in the comparator signal by modulating the inverter control signal to control the switching state of the switching transistors to cause the switching transistors to switch under zero current conditions.

20. An electronic ballast for a gas discharge lamp comprising:

a power supply circuit comprising a buck inductor;

a rectifying circuit coupled to the power supply circuit to provide a rectified buck inductor signal corresponding to voltage across the buck inductor, wherein the rectified buck inductor signal has first and second low signal zones;

a compensator circuit coupled to the rectifying circuit and operable to provide a compensation signal when the rectified buck inductor signal is in the first low signal zone;

a reference source operable to provide a reference signal;

a comparing circuit coupled to the reference source and the compensator circuit to receive the reference signal and the compensation signal;

the comparing circuit operable to provide a comparing circuit output signal that is modulated by comparisons between the reference signal and the compensation signal; and the power supply circuit further comprising an input coupled to receive the comparing circuit output signal, the power supply circuit being responsive to the comparing circuit output signal to control the operation of the lamp.

\* \* \* \* \*